Patented Aug. 4, 1931

1,816,851

UNITED STATES PATENT OFFICE

JOSEPH R. INGRAM, OF NITRO, WEST VIRGINIA, ASSIGNOR TO THE RUBBER SERVICE LABORATORIES COMPANY, OF AKRON, OHIO, A CORPORATION OF OHIO

AGE RESISTING VULCANIZED RUBBER COMPOUND

No Drawing. Application filed April 15, 1930. Serial No. 444,609.

The present invention relates to a process for manufacturing vulcanized rubber products and to the products obtained thereby. It is more particularly directed to a process for vulcanizing rubber wherein there is incorporated into a rubber mix of vulcanization characteristics, a compound of the type hereinafter disclosed whereby anti-oxidant or age resisting properties are developed in the vulcanized rubber product. The invention will be understood from the following description and examples wherein a preferred mode of operating the invention is fully set forth and described.

It is well known to those skilled in the art of rubber compounding that many rubber compounds and particularly those cured in the presence of certain vulcanization accelerators, such for example as diphenyl guanidine and the like possess relatively poor aging qualities; that is, the vulcanized rubber product deteriorates rapidly when exposed to air, heat and sunlight, and that such deterioration exhibits itself by a loss in the tensile strength, resiliency and other desirable properties of the material.

The age resisting characteristics of a vulcanized rubber product can be readily ascertained by subjecting samples of the vulcanized product to an accelerated aging test in a bomb to the action of oxygen under pressure and maintained for several hours at an elevated temperature. The treated samples are then examined and tested and the results compared with similar results obtained by testing the unaged vulcanized stock. The deterioration in properties suffered as a result of the oxidation treatment is indicative of the result that would normally be expected from that particular stock during service. Such a test is known as the Bierer-Davis aging test and produces an effect on a vulcanized rubber stock comparable with that resulting from several years of natural aging of the rubber.

According to the present invention, a new class of anti-oxidants has been found which, upon incorporation into a rubber stock, imparts such excellent age resisting qualities to the vulcanized stock that samples thereof, when subjected to the artificial aging tests described, undergo only a relatively small loss in tensile strength and other qualities. The compounds herein disclosed imparting such remarakble anti-oxidant characteristics to vulcanized rubber, comprise a reaction product of an amino-diphenyl and an aryl hydroxide.

One method whereby one of the preferred class of anti-oxidants, for example, the reaction product of para amino diphenyl and beta naphthol may be prepared follows.

Substantially equi-molecular proportions of para amino diphenyl and beta naphthol are placed in a suitable container and heated preferably in the presence of a small proportion of a suitable catalyst or condensing agent, for example iodine, for a period of time necessary to carry the reaction to completion, but preferably for substantially from three to five hours at a temperature of approximately from 180 to 200° C. The reaction product thus obtained may be purified, if desired, by washing first with a weak alkaline solution, for example a 5% sodium hydroxide solution, and if desirable with a weak acid solution, for example a weak hydrochloric acid solution, then with water. The water washed product after further purifying preferably by digesting with an organic solvent, for example ethyl alcohol, yielded the desired reaction product comprising a solid melting at substantially 125 to 128° C. A portion of the material prepared as described was milled in a typical rubber thread stock in the well known manner comprising 100 parts of smoked sheet rubber
40 parts of carbon black
10 parts of zinc oxide
2 parts of a blended mineral oil and rosin
3.25 parts of sulfur
1 part of diphenyl guanidine
1 part of the reaction product of p-amino diphenyl and beta naphthol The stock was then vulcanized by heating sheets of the stock in the usual manner for different periods of time in a press maintained at the temperature given by forty pounds of steam pressure to the square inch (that is 287° F.). Portions of the stock cured as set forth were then artificially aged by heating samples of said stock in an oxygen bomb in the manner described for 39 hours at a temperature of 70° C. and maintained under a pressure of 300 pounds of oxygen per square inch. The results on testing the aged and unaged stocks follow.

Table I

| Time of cure | Hours aged | Modulus of elasticity in lbs./in.² at elongations of— | | Tensile at break in lbs./in.² | Ultimate elongation per cent |
|---|---|---|---|---|---|
| | | 300% | 500% | | |
| 30 mins. at 287° F | 0 | 770 | 2155 | 3370 | 670 |
| 30 mins. at 287° F | 39 | 1033 | 2335 | 3005 | 620 |
| 60 mins. at 287° F | 0 | 1385 | 3185 | 4305 | 630 |
| 60 mins. at 287° F | 39 | 1490 | 2955 | 3390 | 590 |
| 90 mins. at 287° F | 0 | 1600 | 3025 | 4500 | 600 |
| 90 mins. at 287° F | 39 | 1695 | 3160 | 3275 | 515 |

The reaction product of para amino diphenyl and beta naphthol has also been found to possess very desirable anti-oxidant properties when incorporated in a so-called pure gum stock. Thus, a rubber stock was compounded in the usual manner comprising

```
100   parts of pale crepe rubber
  5   parts of zinc oxide
  3.5 parts of sulfur
  0.75 part of diphenyl guanidine
  1.00 part of the reaction product of p-amino diphenyl and beta
       naphthol.
```

The rubber stock thus prepared was vulcanized by heating in a press in the well known manner for different periods of time at 40 pounds steam pressure per square inch. Portions of the stock cured as set forth were then artificially aged by heating in an oxygen bomb in the manner hereinbefore set forth for 39 hours at a temperature of 70° C. and under an oxygen pressure of 300 pounds of oxygen per square inch. The tensile data obtained on testing the aged and unaged stocks follow in Table II.

Table II

| Time of cure | Lbs. steam pressure | Hours aged | Modulus of elasticity in lbs./in.² at elongations of— | | | Tensile at break in lbs./in.² | Ultimate elongation per cent |
|---|---|---|---|---|---|---|---|
| | | | 300% | 500% | 700% | | |
| 15 | 40 | 0 | 107 | 275 | 973 | 2840 | 885 |
| 15 | 40 | 39 | 148 | 409 | 1535 | 3160 | 835 |
| 30 | 40 | 0 | 161 | 463 | 1920 | 3495 | 805 |
| 30 | 40 | 39 | 230 | 710 | 2615 | 3500 | 760 |
| 45 | 40 | 0 | 230 | 710 | 2810 | 3670 | 750 |
| 45 | 40 | 39 | 276 | 981 | 3515 | 3585 | 705 |

The physical characteristics as set forth in Tables I and II show conclusively that the preferred class of anti-oxidant compounds, for example a reaction product of p-amino diphenyl and beta naphthol function exceptionally well in either pure gum or tread stocks, the tread stocks showing very little depreciation and the pure gum stocks showing practically no depreciation in tensile characteristics and the like even when aged in the oxygen bomb for the very long period of 39 hours.

Another example of the preferred class of anti-oxidants, comprises a reaction product of para amino diphenyl or if desirable its hydrochloride or other salts and alpha naphthol. One method whereby this material has been prepared comprises heating para amino diphenyl hydrochloride and alpha naphthol in the ratio of a slight excess over substantially one molecular proportion of the latter to substantially one molecular proportion of the former in the presence of a small proportion of a catalyst or condensing agent for example iodine until the reaction is completed but preferably for approximately three to four hours at a temperature of substantially 200 to 240° C. The product thus formed is preferably washed successively with a weak alkali, for example an aqueous 5% sodium hydroxide solution, a weak acid solution, for example a 10% hydrochloric acid solution and finally with water. In this manner a resin is produced.

A portion of the above described material was incorporated in the well known manner in a rubber stock comprising

```
100   parts of smoked sheet rubber
 40   parts of carbon black
 10   parts of zinc oxide
  2   parts of a blended mineral oil and rosin
  3.25 parts of sulfur
  1   part of diphenyl guanidine
  1   part of the reaction product of p-amino diphenyl hydro-
       chloride and alpha naphthol.
```

The stock was vulcanized in the usual manner by heating in a press maintained under the temperature given by 40 pounds steam pressure per square inch (287° F.). Portions of the stock cured for 90 minutes as described were subjected to aging tests by heating the stocks in an oxygen bomb for 24 hours at 70° C. and under a pressure of 300 pounds of oxygen per square inch. The results obtained by testing the aged and unaged stocks follow.

Table III

| Time of cure | Hours aged | Modulus of elasticity in lbs./in.² at elongations of— | | Tensile at break in lbs./in.² | Ultimate elongation per cent |
|---|---|---|---|---|---|
| | | 300% | 500% | | |
| 90 Mins | 0 | 1730 | 3990 | 4975 | 620 |
| 90 Mins | 24 | 1725 | 3135 | 3385 | 530 |

From the data set forth in Table III it is apparent the rubber stock cured as described has retained to a marked extent its modulus, tensile and like characteristics on artificially aging in the oxygen bomb for 24 hours under a pressure of 300 pounds of oxygen per square inch.

As further examples of the use of the preferred class of anti-oxidants, reaction products of para amino diphenyl and phenol, para amino diphenyl and beta beta dioxy dinaphthyl methane, ortho amino diphenyl and alpha naphthol were prepared in a manner analogous to that hereinbefore set forth and separately incorporated in a rubber stock comprising.

```
100   parts of smoked sheet rubber
 40   parts of carbon black
 10   parts of zinc oxide
  2   parts of a blended mineral oil and rosin
3.25  parts of sulfur
  1   part of diphenyl guanidine
  1   part of anti-oxidant.
```

The rubber stocks were vulcanized by heating at 287° F. for different periods of time in a press and the vulcanized stock was then aged in the manner hereinbefore described for 24 hours and under a pressure of 300 pounds of oxygen per square inch. On testing the aged and unaged vulcanized rubber stocks it was found the above described materials, that is, the reaction products of para amino diphenyl and phenol, para amino diphenyl and beta beta dioxy dinaphthyl methane, ortho amino diphenyl and alpha naphthol all exhibited characteristic and desirable anti-oxidant properties typical of this class of products.

In all the examples cited, diphenyl-guanidine was used as an accelerator because it is known to produce a vulcanized rubber stock that has notoriously bad aging qualities. Other accelerators could, of course, be used and would produce stocks of different tensile strengths but not otherwise affect the tests described.

By the term amino diphenyl as appearing in the present specification is meant an amino derivative of a compound resulting through the joining of two phenyl groups through carbon atoms in the nucleus by means of a single bond.

The various examples hereinbefore set forth in detail are to be understood as illustrative only and not at all limitative of the scope of the invention. Other compounding ingredients including accelerators and other proportions of ingredients than those indicated in the various examples may be employed in the manufacture of various types of vulcanized rubber products as is well known to those skilled in the art to which the invention pertains. The invention is to be understood as limited solely by the claims attached hereto as a part of this specification wherein the invention is claimed as broadly as possible in view of the prior art.

What is claimed is:

1. A process of treating rubber which comprises heating rubber and sulfur in the presence of an anti-oxidant comprising a reaction product of an amino diphenyl and an aryl hydroxide.

2. A process of treating rubber which comprises heating rubber and sulfur in the presence of an anti-oxidant comprising a reaction product of an amino diphenyl and a naphthol.

3. A process of treating rubber which comprises heating rubber and sulfur in the presence of an anti-oxidant comprising a reaction product of an amino diphenyl and beta naphthol.

4. A process of treating rubber which comprises heating rubber and sulfur in the presence of an anti-oxidant comprising a reaction product of para amino diphenyl and an aryl hydroxide.

5. A process of treating rubber which comprises heating rubber and sulfur in the presence of an anti-oxidant comprising a reaction product of para amino diphenyl and a naphthol.

6. A process of treating rubber which comprises heating rubber and sulfur in the presence of an anti-oxidant comprising a reaction product of para amino diphenyl and beta naphthol.

7. A process of treating rubber which comprises heating rubber and sulfur in the presence of an anti-oxidant comprising a reaction product of substantially equi-molecular proportions of para amino diphenyl and beta naphthol.

8. The vulcanized rubber product prepared by heating rubber of vulcanization characteristics in the presence of an anti-oxidant comprising a reaction product of an amino diphenyl and an aryl hydroxide.

9. The vulcanized rubber product prepared by heating rubber of vulcanization characteristics in the presence of an anti-oxidant comprising a reaction product of an amino diphenyl and a naphthol.

10. The vulcanized rubber product prepared by heating rubber of vulcanization characteristics in the presence of an anti-oxidant comprising a reaction product of an amino diphenyl and beta naphthol.

11. The vulcanized rubber product prepared by heating rubber of vulcanization characteristics in the presence of an anti-oxidant comprising a reaction product of para amino diphenyl and an aryl hydroxide.

12. The vulcanized rubber product prepared by heating rubber of vulcanization characteristics in the presence of an anti-oxidant comprising a reaction product of para amino diphenyl and a naphthol.

13. The vulcanized rubber product prepared by heating rubber of vulcanization characteristics in the presence of an anti-oxidant comprising a reaction product of para amino diphenyl and beta naphthol.

14. The vulcanized rubber product prepared by heating rubber of vulcanization characteristics in the presence of an anti-oxidant comprising a reaction product of substantially equi-molecular proportions of para amino diphenyl and beta naphthol.

15. The vulcanized rubber product prepared by heating rubber of vulcanization characteristics in the presence of an antioxidant comprising a reaction product of an amino diphenyl and a mono-hydroxy aryl compound.

In testimony whereof I hereunto affix my signature.

JOSEPH R. INGRAM.